(12) United States Patent
Laudet et al.

(10) Patent No.: US 9,156,736 B2
(45) Date of Patent: *Oct. 13, 2015

(54) MORTAR COMPOSITION, METHOD OF PREPARATION THEREOF AND USE THEREOF

(71) Applicant: PAREXGROUP SA, Issy les Moulineaux (FR)

(72) Inventors: Alain Laudet, Namur (BE); Daniel Daviller, Chatillon-le-duc (FR)

(73) Assignee: PAREXGROUP SA, Issy les Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/200,811

(22) Filed: Mar. 7, 2014

(65) Prior Publication Data

US 2014/0205751 A1    Jul. 24, 2014

Related U.S. Application Data

(63) Continuation of application No. 12/084,413, filed as application No. PCT/EP2006/068033 on Nov. 2, 2006, now Pat. No. 8,668,773.

(30) Foreign Application Priority Data

Nov. 4, 2005    (EP) .................................... 05110367

(51) Int. Cl.
| | |
|---|---|
| C04B 24/00 | (2006.01) |
| C04B 26/02 | (2006.01) |
| C04B 28/02 | (2006.01) |
| C04B 103/00 | (2006.01) |
| C04B 111/60 | (2006.01) |

(52) U.S. Cl.
CPC ................. C04B 24/00 (2013.01); C04B 26/02 (2013.01); C04B 28/02 (2013.01); C04B 2103/0075 (2013.01); C04B 2111/60 (2013.01)

(58) Field of Classification Search
CPC  C04B 20/1025; C04B 20/104; C04B 24/108; C04B 2103/304; C04B 2103/306; C04B 41/47; C04B 24/00; C04B 2103/0075; C04B 2111/60
USPC .......... 106/660, 795, 802, 807, 622, 606, 724
See application file for complete search history.

(56) References Cited

U.S. PATENT DOCUMENTS

| | | | |
|---|---|---|---|
| 3,656,979 A | 4/1972 | Striebel | |
| 4,127,001 A | 11/1978 | Tomic | |
| 4,148,941 A | 4/1979 | Pape et al. | |
| 4,597,796 A | 7/1986 | Ernst et al. | |
| 6,124,366 A | 9/2000 | Pullen | |
| 6,878,200 B2 | 4/2005 | Kikuchi et al. | |
| 8,668,773 B2 * | 3/2014 | Laudet et al. ................. | 106/724 |
| 2005/0092491 A1 | 5/2005 | Chatterji et al. | |

FOREIGN PATENT DOCUMENTS

| | | |
|---|---|---|
| DE | 1646502 | 9/1971 |
| DE | 3238390 | 5/1983 |
| DE | 19812247 | 9/1990 |
| DE | 199 50 106 | 4/2001 |
| EP | 0 133 953 | 3/1985 |
| FR | 1478886 | 4/1967 |
| FR | 2349550 | 11/1977 |
| FR | 2723085 | 2/1996 |
| GB | 370878 | 4/1932 |
| GB | 693765 | 7/1953 |
| GB | 892015 | 3/1962 |
| GB | 1075459 | 7/1967 |
| GB | 1227355 | 12/1967 |
| GB | 1190903 | 5/1970 |
| GB | 1227355 | 4/1971 |
| JP | 57-7852 | 1/1982 |
| JP | 05-140543 | 8/1993 |
| JP | 61-58047 | 6/1994 |
| JP | 6-279080 | 10/1994 |
| JP | 07-206504 | 8/1995 |
| JP | 8-073252 | 3/1996 |
| JP | 2003-252665 | 9/2003 |
| WO | WO 00/34200 | 6/2000 |
| WO | WO 2006/084588 | 8/2006 |

OTHER PUBLICATIONS

"Mortar Testing for Quality Assurance: Best Practices". Masonry Today [Retrieved on Mar. 12, 2013]. Retrieved from http://www.cement.org/masonry/PL385_testing.pdf.

* cited by examiner

*Primary Examiner* — Kaj K Olsen
*Assistant Examiner* — Karam Hijji
(74) *Attorney, Agent, or Firm* — Vedder Price P.C.; Thomas J. Kowalski; Deborah L. Lu

(57) ABSTRACT

A mortar composition in the form of a dry powder, ready for use, comprising at least one powdery binder and at least one aggregate, as well as possibly at least one standard additive and/or adjuvant, and formed from particles, at least some of which, referred to as fine particles, are liable to produce an emission of dust, characterized in that it also comprises a fluid additive that consists of least one non-polar hydrocarbon organic substance and that has a capacity for agglomeration of the said fine particles, and in that the dry mortar composition comprises agglomerates of line particles formed by the fluid additive.

16 Claims, No Drawings

MORTAR COMPOSITION, METHOD OF PREPARATION THEREOF AND USE THEREOF

RELATED APPLICATIONS AND INCORPORATION BY REFERENCE

This application is a continuation of U.S. patent application Ser. No. 12/084,413, filed Apr. 30, 2008, which is a §371 of international patent application Serial No. PCT/EP2006/068033, filed Nov. 2, 2006, which published as PCT Publication No. WO 2007/051817 on May 10, 2007, which claims benefit of European patent application Serial No. 05110367.9, filed Nov. 4, 2005.

FIELD OF THE INVENTION

The present invention relates to dry industrial mortars and renders/plaster, and to the methods of preparation thereof and use thereof.

BACKGROUND OF THE INTENTION

Mortar compositions in the form of dry powder ready for use have been known for a long time, comprising at least one powdery binder and at least one aggregate, as well as possibly at least one standard additive and/or adjuvant, and formed from particles, at least some of which, referred to as fine particles, are liable to produce an emission of dust. This type of composition, generally referred to as "industrial" mortar, is a mortar batched and mixed in the factory. It is "dry", that is to say ready to be mixed with water.

Amongst the aforementioned binders, mineral binders can be cited, such as slaked lime, cements, gypsum render/plaster or the like, and organic binders, such as for example certain synthetic resins. As aggregates (sometimes referred to as agglomerates), sand, stone powder, crushed brick or the like can be mentioned.

The expression mortar means all compositions meeting the particularities given above and therefore also renders/plasters. "Render/plaster coat" means a layer applied in one or more passes using the same mortar, without leaving the first pass to dry before applying the second. Then the "undercoat" or sub-layer coat is distinguished, namely the "bottom layer or layers of a system", of the "final coat" or façade coat or finishing coat; namely the "top layer of a multi-coat system".

The aforementioned industrial mortars and ready dry renders/plasters have the well-known long-standing drawback of high emission of dust both during manufacture by mixing their constituent components, during bagging and during manipulation before mixing on the site of use.

This emission of dust is the subject of regulation on the protection of workers, which is continually being strengthened.

Moreover, the aforementioned emission of dust gives rise to a degradation of the local environment, in the factory and on the site, requiring particularly constraining cleaning and protection work. The problem of the emission of dust is particularly critical during work in a closed habitat, in particular during renovation of inhabited interiors.

Finally, the emission of dust will mainly concern the fractions of mortars and renders/plasters having the finest particles, which are often the low-content adjuvants. These constituents are in general the most critical and the most expensive in the formulation; if they partially get into the atmosphere in the factory and/or on the site this may lead to an imbalance in the composition of the mortar and therefore to a loss of performance.

In any other field, it is known how to reduce the emission of dust emitted during the treatment of soil with quicklime, by the agglomeration of the lime fines by means of a non-aqueous fluid additive [EP 0880569 B2].

The addition, to the mortars and renders/plasters, of polar organic liquids, in particular functionalised polyolefins having for example carboxylic functions or any other equivalent function (alcoholic or phenolic), is known so as to improve the adhesion and workability of the compositions, for the purpose of limiting the addition of water during mixing (reduction in the water/binder ratio) [JP 08081249, JP 05058695, U.S. Pat. No. 4,586,960]. It should however be noted that in no cases have such polar compounds been deemed to reduce the emission of dust from the compositions to which they have been added.

"Workability" means all the properties of use of a mortar that confer on its suitability for use. This concept is also sometimes referred to as "plasticity".

Compositions are known for repairing cracks in walls (see WO 00/34200). According to circumstances, these compositions are before use in the form of a paste containing a large proportion of water or in a dry form to which water is added before application. In order, after hardening of the joints, to avoid the latter emitting dust in an undesirable manner during sanding, provision is made in the document for adding to the paste containing water or to the powder mixed with water a dust-suppressant liquid additive. As an alternative, a coating of the hardened joint with a layer of the dust-suppressant liquid additive is also provided.

SUMMARY OF THE INVENTION

The object of the present invention is the development of industrial mortar compositions or ready dry render/plaster compositions that have a reduced emission of dust during their manufacture, their manipulation or their use on site. These compositions must maintain the physical and chemical characteristics of the mortars and renders/plasters compared with the minimum requirements demanded by the applications, including after a storage period of several months. Another object of the present invention is to propose a method of preparing such industrial mortars or ready dry renders/plasters, having a limited emission of dust.

This problem is resolved according to the invention by a mortar composition as indicated at the start, which also comprises a fluid additive that consists of at least one non-polar hydrocarbon organic substance and that has a capacity for agglomeration of the said fine particles, the composition of the dry mortar comprising agglomerates of fine powders formed by the fluid additive.

Preferably, the composition according to the invention comprises the said fluid additive in a maximum quantity of 40 g per kg, preferably 20 g per kg. Preferentially, it may contain from 4 to 10 g of fluid additive per kg of mortar composition.

Advantageously, the fluid additive is hydrophobic and can be chosen from mineral oils, paraffin oils, paraffins, polyolefins or mixtures of these substances.

A person skilled in the art might expect, when the fluid additive according to the invention is added to a mortar or render/plaster composition, a drastic drop in the essential adhesion characteristics thereof, and an impairment in performance, such as the flow, permeability to water, mixing level (water/mortar ratio), the mixing time, the setting time and the open time (the maximum period after application for effecting the finishing). For finishing render/plaster coats, a prejudicial change to the color might even be expected.

It is clear that the addition of a non-polar hydrocarbon organic substance to a mortar or render/plaster according to the invention does indeed lead to a product having a significant reduction in the emission of dust, compared with the untreated mortar or render/plaster (without fluid additive). The comparison of the dust-creating behaviour of the treated and untreated products is obtained on the basis of the application of the French standard NE P 94-103 of December 2004, concerning the "determination of the degree of emission of dust from a powdery product (DED)". This reduction in the emission of dust is maintained, including after a storage of several months.

In addition to the reduction of the emission of dust and against all expectations, it is also clear that the mortar composition according to the invention exhibits no degradation in the aforementioned physical and chemical characteristics in comparison with an untreated product.

In addition, and unexpectedly, the mortars and ready dry renders/plasters according to the invention often have a "workability" superior to the same untreated product.

The industrial mortars and ready dry renders/plasters according to the invention therefore resolve the problem relating to the emission of dust from conventional products without the loss of any of its properties and even with an improvement in workability.

The present invention also concerns a method of preparing a mortar composition according to the invention. This method can advantageously comprise a mixture of the said at least one powdery binder, the said at least one aggregate and possibly the said at least one standard additive and/or adjuvant and, before this mixing, an addition of the said fluid additive to at least one constituent of the said mixture. According to another embodiment of the invention, it comprises a mixing of the said at least one powdery binder, the said at least one aggregate and possibly the said at least one standard additive and/or adjuvant and, during mixing, an addition of the said fluid additive. According to yet another embodiment of the invention, it comprises a mixing the said at least one powdery binder, the said at least one aggregate and possibly the said at least one standard additive and/or adjuvant and, after mixing, an addition of the said fluid additive to the mixture obtained.

The present invention also relates to the use of a mortar composition according to the invention for mixing thereof with water with a view to forming a mortar, a render/plaster, a roughcast, a screed, a high-bond mortar and similar products. It also concerns the mortars, renders/plasters, screeds and tile adhesive as obtained by means of a mortar composition according to the invention and/or by means of a composition prepared according to a method in accordance with the invention.

Other particularities of the invention are indicated in the accompanying claims.

DETAILED DESCRIPTION OF THE INVENTION

The invention will now be described in more detail by means of non-limiting examples.

Example 1

A ready dry high-bond mortar (1) is prepared by the dry mixing of the following constituents (percentages by weight):
  43.5% standard Portland cement CEM II B 42.5,
  1% pozzuolanic reagent, in the form of a natural volcanic rock,
  51.6% siliceous sand with a grain size below 750 μm,
  3.5% polyvinyl alcohol,
  0.4% hydroxymethylcellulose.

In addition, a high-bond mortar (2) with a composition identical to the previous one is prepared according to the invention by dry mixing with the supplementary addition of 0.5% of mineral oil of the Shell Ondina 917 type with respect to the total weight of the mortar composition (1) (5 g of oil/kg untreated mortar).

The dust-creating behaviour of the above two mortars is compared on the basis of the standard NF P 94-103 of December 2004, concerning the "determination of the degree of emission of dust of a powdery product (DED)", under operating conditions slightly different from the standard, in order best to discriminate the emission of dust from the mortar. The negative pressure taught at §6.2 is 2.59 hPa instead of 5.52 hPa and the suction duration is 3 minutes instead of 4 minutes.

With these operating conditions, the degree of emission of dust (DED) is 34% for conventional untreated mortar (1) and only 15% for the mortar treated according to the invention (2). This is a significant and unexpected reduction in the dust-creating behaviour of the mortar according to the invention compared with conventional mortar, which contains however an olefin, polyvinyl alcohol, in significant quantities. This "functionalised" olefin seems in fact to have no effect on the emission of dust from the mortar composition.

Samples of conventional mortars (1) and according to the invention (2) are tested in order to check the preservation of their physical and chemical characteristics. In both cases, the "wet" mortar (after mixing) was prepared with a water/mortar ratio of 0.58. The determination of the adhesion is carried out in conformity with French standard NF EN 1348. The adhesion is 0.6 N/mm2 for the reference mortar (1) and 0.7 N/mm2 for the mortar (2) according to the invention. These are two values that are considered to be equivalent, perfectly in accordance with the specifications.

The adhesion of the high-bond mortar according to the invention is indeed maintained compared with the untreated product. In addition, an improvement in workability was observed by trade operators, during blind tests, in the case of the high-bond mortar according to the invention.

Example 2

A ready dry undercoat render (3) is prepared by mixing of the following constituents (percentages by weights):
  23% standard Portland cement CEM II B 8 42.5,
  7% slaked lime (Ca(OH)2),
  68% siliceous sand with a grain size of less than 1 mm,
  1.5% polyvinyl alcohol,
  0.2% surfactant,
  0.3% fatty acid ester, In addition, a ready dry undercoat render (4) with a composition identical to the previous one is prepared according to the invention by dry mixing with the supplementary addition of 0.5% of mineral oil of the Shell Ondina 917 type with respect to the total weight of render composition (3).

The dust-creating behaviour of the above two renders is compared as in example 1. The degree of emission of dust (DED) is 22% for the conventional untreated reference render (3) and only 9% for the render treated according to the invention (4). This is a significant reduction in the dust-creating behaviour of the render according to the invention.

Samples of the conventional renders (3) and according to the invention (4) are tested in example 1, in order to check the preservation of their physical and chemical characteristics. In both cases, the "wet render" (after mixing) was prepared with a water/coating ratio of 0.23. The resistance to flexion and compression was determined in accordance with the French standard NE EN 1015-11 and permeability in accordance with the French standard NE EN 1323. Results of the various tests for the two coatings appear in table 1 below.

TABLE 1

Comparison of the physical and chemical properties of the undercoat renders treated according to the invention (4) and reference untreated (2).

|  | Reference render (3) | Render according to the invention (4) |
|---|---|---|
| Adhesion [N/mm2] | 0.5 | 0.5 |
| Resistance to flexion Rf [Mpa] | 2.7 | 2.7 |
| Resistance to compression Rc [Mpa] | 8.5 | 7.2 |

Table 1 confirms that the essential physical and chemical properties of the render according to the invention (4) remain in accordance with the specifications, after the dust suppressant treatment. The reduction from 8.5 to 7.2 Mpa in the resistance to compression is not significant and remains superior to a minimum of 5 Mpa. In addition, an improvement in workability was Observed by trade operators, during blind tests, in the case of the render according to the invention.

Example 3

A ready dry finishing render coat (5) is prepared by the dry mixing of the following constituents (percentages by weight):
6% standard Portland cement CEM IIB 42.5,
12% slaked lime (Ca(OH)2),
81% siliceous sand with a grain size of less than 2 mm,
0.3% starch,
0.3% surfactant,
0.4% fatty acid ester.

In addition, a ready dry finishing render coat (6) with a composition identical to the previous one is prepared according to the invention by dry mixing with the supplementary addition of 0.7% of mineral oil of the Shell Ondina 917 type with respect to total weight of the render composition (5).

The dust-generating behaviour of the above 2 renders is compared as in examples 1 and 2. The degree of emission of dust (DED) is 17% for the untreated conventional reference render (5) and only 8% for the render treated according to the invention (6). Once again this is a significant reduction in the dust-generating behaviour of the render according to the invention.

Samples of the conventional renders (5) and according to the invention (6) are tested, in order to check the maintenance of their physical and chemical characteristics. In both cases, the "wet" render (after mixing) was prepared with a water/coating ratio of 0.22. A test of permeability to water was carried out on the two renders, in accordance with French standard NF EN 1323.

The permeability to water of the reference render (5) is 0.002 ml/min·cm$^2$ and that of the render according to the invention (6) is 0.001 ml/min·cm$^2$. These two values are significantly different for a person skilled in the art. The render according to the invention (6) affords an acknowledged improvement to the impermeability of the render. Moreover, no significant difference in color was observed between the two renders. Finally, an improvement to workability was observed by trade operators, during blind tests, in the case of the render according to the invention.

These examples together illustrate perfectly the significant reduction in the emission of dust of the mortars and renders according to the invention, compared with the same untreated products. Moreover, they confirm the absence of degradation of the properties of the mortars and renders according to the invention, despite the addition of mineral oil to their composition. Finally, the improvement in workability of the mortars and renders according to the invention also appears.

It must be understood that the present invention is in no way limited to the embodiments described above and that many modifications can be made thereto without departing from the scope of the accompanying claims.

As other examples of fluid additives according to the invention, available on the market, it is possible for example to cite a white mineral oil, a polyalpha-olefin (of the Nextbase 2002 type from Neste), a poly-intra-olefin (of the MX2101 type from Mixoil), etc.

The invention claimed is:

1. A dry powder cementitious tile adhesive composition ("CTA") ready to be mixed with water, said dry powder CTA comprising at least one powdery binder that comprises a mineral binder that includes cement, and at least one aggregate,
wherein:
the cement of the mineral binder comprises standard Portland cement, and the mineral binder optionally further including slaked lime, gypsum plaster or mixtures thereof;
the dry powder CTA contains a fluid additive present in a maximum amount of 40 g per kg by weight of the dry powder CTA; and
the fluid additive is hydrophobic and selected from the group consisting of mineral oil, paraffin oil, paraffin, polyolefin or mixtures thereof;
wherein when the dry powder CTA is admixed with water, a CTA results that has adhesion as a CTA as determined in conformity with standard NF EN 1348.

2. The dry powder CTA according to claim 1 wherein the standard Portland cement of the mineral binder is present in an amount of up to 43.5% by weight of the dry powder CTA.

3. The dry powder CTA according to claim 1 wherein the aggregate includes is present in a minimum amount of 51.6% by weight of the dry powder CTA.

4. The dry powder CTA according to claim 1 wherein when admixed with water in a water/CTA ratio of 0.58, the resultant CTA has adhesion as determined in conformity with standard NF EN 1348 of at least 0.6 N/mm2.

5. The dry powder CTA according to claim 1 wherein the aggregate includes sand, stone powder, or crushed brick.

6. A method for preparing the dry powder CTA according to claim 1 comprising admixing the at least one powdery binder, the at least one aggregate and, the fluid additive.

7. The method of claim 6 wherein the admixing comprises adding the fluid additive during mixing of the at least one powdery binder and the at least one aggregate.

8. The method of claim 6 wherein the admixing comprises adding the fluid additive after mixing of the at least one powdery binder and the at least one aggregate.

9. A method for preparing a CTA comprising admixing water and the dry powder CIA according to claim 1.

10. The CTA prepared by the method of claim 9.

11. A method of adhering a tile comprising applying to the tile the CTA of claim 10.

12. A method of adhering a tile comprising admixing water and the dry powder CTA of claim 1 to prepare a CTA, and applying the CTA to the tile.

13. A method for preparing a dry powder cementitious tile adhesive composition ("CTA") comprising at least one powdery binder that comprises a mineral binder that includes cement, and at least one aggregate,
   wherein:
   the cement of the mineral binder comprises standard Portland cement, and the mineral binder optionally further including slaked lime, gypsum plaster or mixtures thereof; and
   said method comprising:
   including in the dry powder CTA a fluid additive present in a maximum amount of 40 g per kg by weight of the dry powder CTA,
   wherein the fluid additive is hydrophobic and selected from the group consisting of mineral oil, paraffin oil, paraffin, polyolefin or mixtures thereof;
   wherein when the dry powder CTA is admixed with water, a CTA results that has adhesion as a CTA as determined in conformity with standard NF EN 1348.

14. The method according to claim 13 wherein the mineral binder is present in an amount of up to 43.5% by weight of the dry powder CTA.

15. The method according to claim 13 wherein the aggregate includes sand, stone powder, or crushed brick.

16. The method according to claim 13 wherein the aggregate is present in an amount of a minimum of 51.6% by weight of the dry powder CTA.

* * * * *